(12) United States Patent
Colyn et al.

(10) Patent No.: US 12,031,334 B2
(45) Date of Patent: Jul. 9, 2024

(54) BUILDING SURFACE PANEL WITH REINFORCED NAIL SLOT, AND METHOD OF MANUFACTURE

(71) Applicant: CertainTeed LLC, Malvern, PA (US)

(72) Inventors: Christopher Michael Colyn, Grandville, MI (US); Neil J. Sexton, Jackson, MI (US); Jay M. Tudor, Goodrich, MI (US)

(73) Assignee: CertainTeed LLC, Malvern, PA (US)

( * ) Notice: Subject to any disclaimer, the term of this patent is extended or adjusted under 35 U.S.C. 154(b) by 0 days.

(21) Appl. No.: 17/752,268

(22) Filed: May 24, 2022

(65) Prior Publication Data

US 2022/0381040 A1  Dec. 1, 2022

Related U.S. Application Data

(60) Provisional application No. 63/192,651, filed on May 25, 2021.

(51) Int. Cl.
*E04F 13/08* (2006.01)
*B29C 48/00* (2019.01)
*E04F 13/18* (2006.01)

(52) U.S. Cl.
CPC ...... *E04F 13/0833* (2013.01); *E04F 13/0864* (2013.01); *E04F 13/0894* (2013.01); *E04F 13/18* (2013.01); *B29C 48/0022* (2019.02); *B29C 2793/009* (2013.01)

(58) Field of Classification Search
CPC .............. E04F 13/0833; E04F 13/0864; E04F 13/0894; E04F 13/18; E04F 13/0835
See application file for complete search history.

(56) References Cited

U.S. PATENT DOCUMENTS

| 5,675,955 | A | 10/1997 | Champagne |
| 6,363,676 | B1 | 4/2002 | Martion, III |
| 6,370,832 | B1 | 4/2002 | McGarry |
| 6,955,019 | B2 * | 10/2005 | Donlin ................ E04F 13/0864 52/546 |
| 7,441,383 | B2 | 10/2008 | O'Neal |
| 7,739,847 | B2 | 6/2010 | Griman |
| 9,068,362 | B1 | 6/2015 | Baxter |

(Continued)

FOREIGN PATENT DOCUMENTS

JP  3627023 B2 *  3/2005

OTHER PUBLICATIONS

Office action issued in Canadian Application No. 3, 160,272 (4 pages). (Year: 2023).*

*Primary Examiner* — Rodney Mintz
(74) *Attorney, Agent, or Firm* — McDonnell Boehnen Hulbert & Berghoff LLP

(57) ABSTRACT

The present disclosure relates generally to cladding, for example, suitable for covering a building surface. The present disclosure relates more particularly to a building surface panel including a longitudinal panel body and a fastening element. The longitudinal body extends along a length from a first end to a second end and having a first edge and a second edge. The fastening element includes a longitudinal strip extending along the first edge of the panel body, a first aperture passing through the longitudinal strip, and a first reinforcing projection extending outward from a perimeter edge of the first aperture.

17 Claims, 8 Drawing Sheets

(56) References Cited

U.S. PATENT DOCUMENTS

| | | | |
|---|---|---|---|
| 9,903,607 B2* | 2/2018 | Barrett | B32B 27/38 |
| 10,184,254 B2* | 1/2019 | Piché | E04F 13/0894 |
| 10,557,271 B2 | 2/2020 | Olvey | |
| 11,220,825 B2* | 1/2022 | Steffes | E04D 1/20 |
| 2004/0159062 A1* | 8/2004 | Donlin | E04F 13/0864 |
| | | | 52/518 |
| 2005/0252138 A1* | 11/2005 | Griman | E04F 13/0864 |
| | | | 52/521 |
| 2007/0107357 A1 | 5/2007 | O'Neal | |
| 2007/0144096 A1* | 6/2007 | O'Neal | E04F 13/0864 |
| | | | 52/549 |
| 2017/0022719 A1* | 1/2017 | Piché | E04F 13/185 |
| 2017/0089077 A1* | 3/2017 | Olvey | E04F 13/0864 |
| 2017/0219244 A1 | 8/2017 | Barrett | |
| 2019/0301173 A1* | 10/2019 | Steffes | E04D 1/20 |
| 2021/0230878 A1* | 7/2021 | Pina | E04F 13/0848 |

\* cited by examiner

BUILDING SURFACE PANEL WITH REINFORCED NAIL SLOT, AND METHOD OF MANUFACTURE

CROSS-REFERENCE TO RELATED APPLICATIONS

This application claims the benefit of priority of U.S. Provisional Patent Application No. 63/192,651, filed May 25, 2021.

BACKGROUND OF THE DISCLOSURE

1. Field of the Disclosure

The present disclosure relates generally to cladding for covering a building surface. The present disclosure relates more particularly to building surface panels that include a reinforced nail slot.

2. Technical Background

Building surface panels, such as cladding or siding, are visible elements that cover an underlying support structure. Siding panels and related accessories are typically used in the construction of homes, businesses, and other buildings on exterior walls. The panels can provide protection to the underlying support structure from weather and other elements.

One aspect of the durability of a building surface panel is the resistance to failure where the panel is attached to an underlying support structure. For example, under high loads, such as heavy winds, a panel may fail at the attachment point. One way to prevent such failure is to make the panel thicker. The added thickness provides additional support to the panel, and increases the strength of the panel against such loads. However, there is a substantial cost associated with adding thickness to the panel, as it increases the volume of material that is used to make the panel. Further, shipping costs of thicker panels are also increased, as thicker panels are heavier.

The present inventors have determined that building surface panels with increased resistance to failure at the attachment points, without substantially adding to the cost of the panel, would be attractive to both builders and customers.

SUMMARY OF THE DISCLOSURE

In one aspect, the present disclosure provides a building surface panel comprising:
a longitudinal panel body extending along a length from a first end to a second end and having a first edge and a second edge; and
a fastening element including:
a longitudinal strip extending along the first edge of the panel body,
a first aperture passing through the longitudinal strip, and
a first reinforcing projection extending outward from an edge of the first aperture.

In another aspect, the disclosure provides a building surface cladding system comprising:
a support structure having a front face;
a building surface panel according to the disclosure disposed against the front face of the support structure; and
a fastener extending through the first aperture of the building surface panel and into the support structure so as to hold the building surface panel against the support structure.

In another aspect, the disclosure provides a method of making a building surface panel according to the disclosure, the method comprising:
extruding a material sheet through a die;
shaping the material sheet so as to form the panel body, and a longitudinal strip of a fastening element;
cutting an opening through the material sheet; and
pushing a section of the material sheet that is adjacent to the opening outward from the rest of the material sheet so as to form the first aperture in the material sheet and the first reinforcing projection formed by the section of the material sheet.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that building surface panels can fail under high loads at the attachment point. The present inventors have determined that a configuration that decreases the chance of failure without substantially increasing costs would be attractive to builders and customers.

Accordingly, one aspect of the disclosure is a building surface panel including a longitudinal panel body and a fastening element. The longitudinal body extends along a length from a first end to a second end and having a first edge and a second edge. The fastening element includes a longitudinal strip extending along the first edge of the panel body, a first aperture passing through the longitudinal strip, and a first reinforcing projection extending outward from a perimeter edge of the first aperture.

Figure 1A:
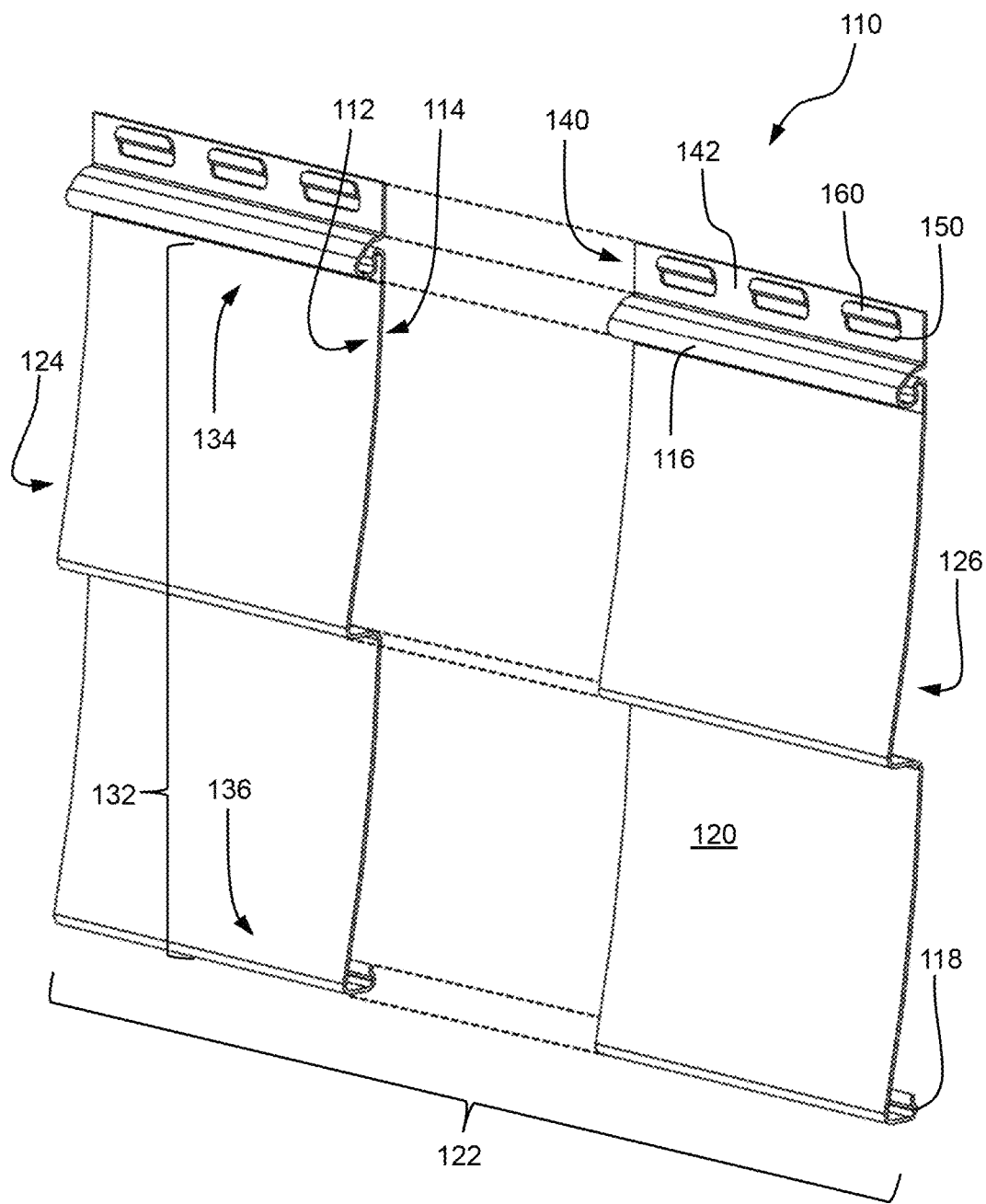
FIG. 1A is a schematic perspective view of a building surface panel according to an embodiment of the disclosure.

Such a building surface panel is shown in perspective view in FIG. 1A. Building surface panel 110 has rear side 114 configured to face a support structure and a front side 112 configured to face outward and away from the support structure. Building surface panel 110 includes a longitudinal panel body 120 and a fastening element 140 configured to secure the panel to a support structure, as explained in more detail below. Panel body 120 has a length 122 extending from a first end 124 to a second end 126 and a width 132 extending from a first edge 134 to a second edge 136. Fastening element 140 includes a longitudinal strip 142 that extends along the first edge 134 of panel body 120. In the illustrated embodiment, building surface panel 110 is oriented such that first edge 134 is an upper edge of the panel body 120 and fastening element 140 is disposed above panel body 120. However, building surface panel 110 can be disposed in other orientations, for example, with the length of the panel running vertically and the fastening element disposed on the lateral side of the panel body. Further, the building surface panel may be installed with the fastening element disposed below the panel body in some configurations.

A first aperture 150 passes through longitudinal strip 142 and is configured to receive a mechanical fastener, such as a screw or nail, for securing the building surface panel 110 to the support structure. As shown more clearly in the detailed view of FIGS. 1B and 1C, first aperture 150 is defined by a perimeter edge 152 that extends around the void formed within the aperture. A first reinforcing projection 160 extends outward from perimeter edge 152 of first aperture 150.

The first reinforcing projection 160 of fastening element 140 provides additional material around the perimeter edge 152 of first aperture 150, which helps to strengthen the aperture. Accordingly, when heavy loads, such as high wind, pull the building surface panel 110 against a mechanical fastener inserted through first aperture 150, the material surrounding first aperture 150 is less likely to warp or bend. The strengthened fastening element 140 is therefore less likely to be broken or pulled off the fastener.

In certain embodiments of the building surface panel as otherwise described herein, the first aperture is a slot that extends along the length of the longitudinal strip. For example, first aperture 150 of fastening element 140 is an elongate slot that extends along the length of the longitudinal strip 142, panel body 120 and building surface panel 110 in general. The elongated shape of first aperture 150, i.e., in the form of a slot, allows the building surface panel 110 to move with respect to a fastener extending through the first aperture 150. In particular, the building surface panel 110 can move along the length direction by sliding back and forth over the fastener within the slot. This allows the building surface panel to expand and contract along its length without adding significant stress within the panel.

Figure 1B:
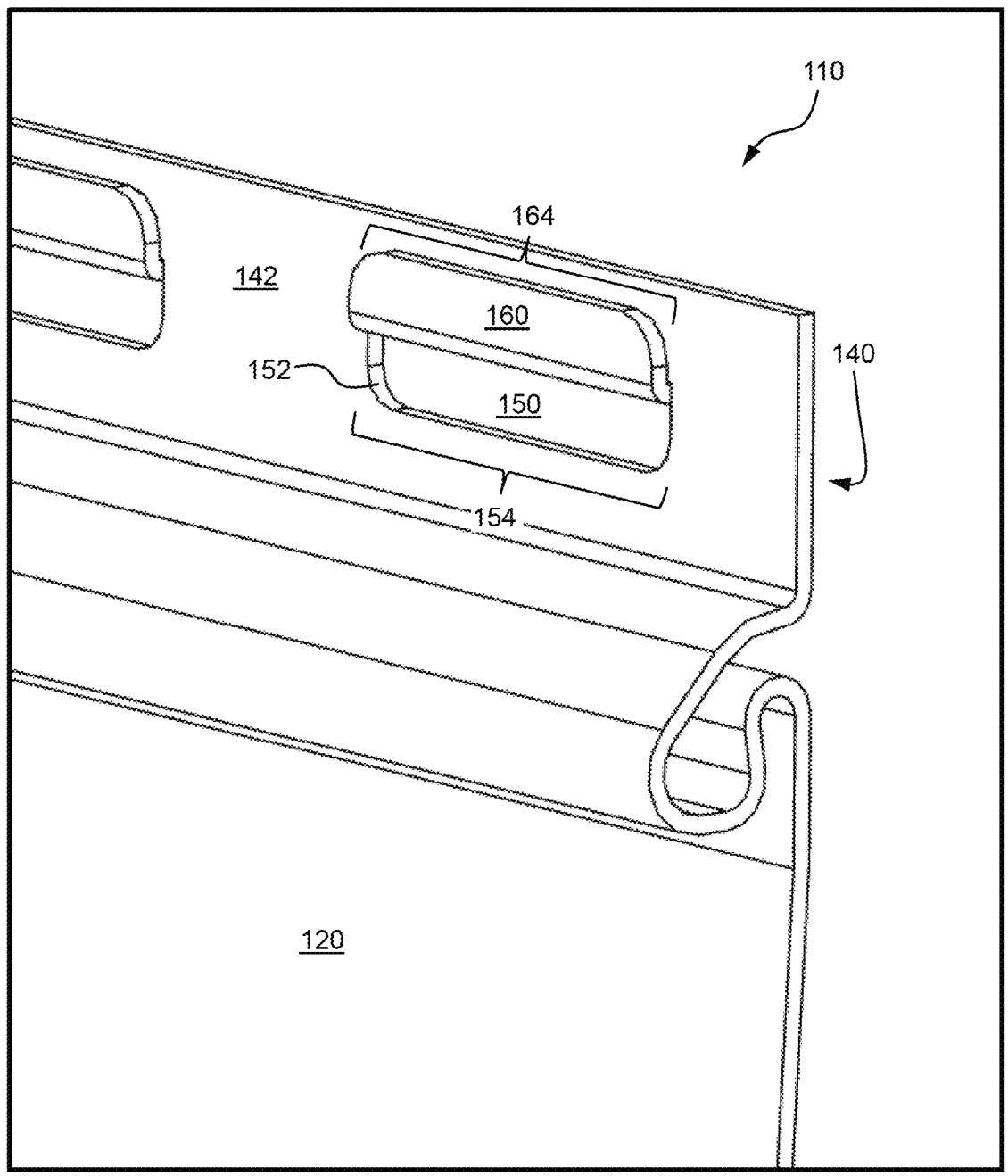
FIG. 1B is an enlarged schematic perspective view of a portion of the building surface panel of FIG. 1A.
Figure 1C:
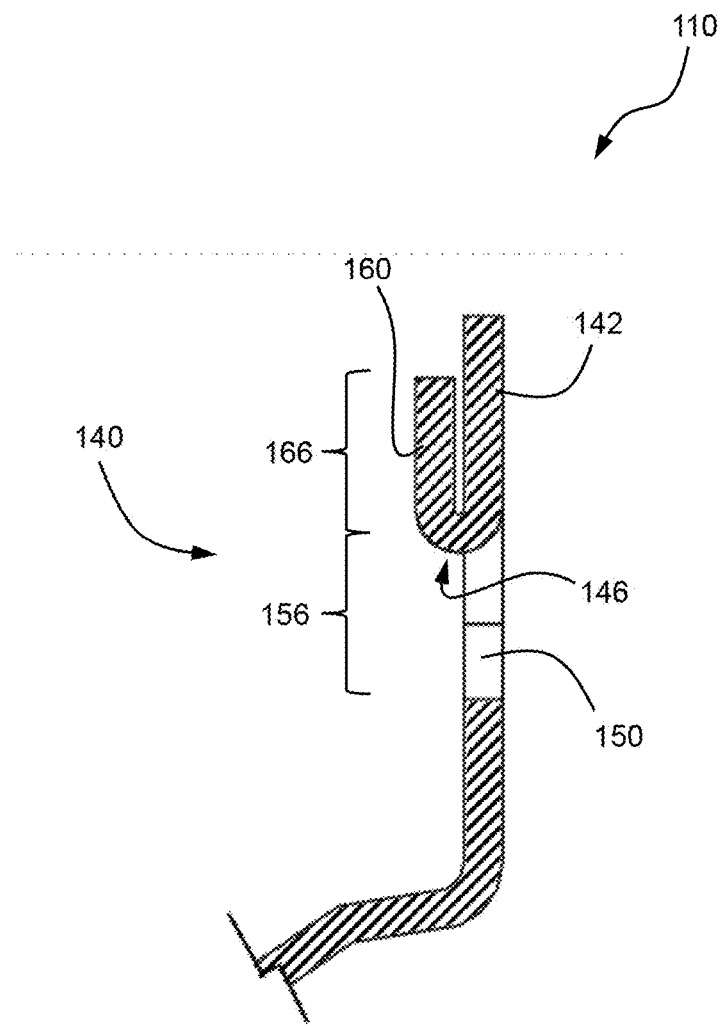
FIG. 1C is a schematic cross-sectional view of a portion of the building surface panel of FIG. 1A.
Figure 2A:
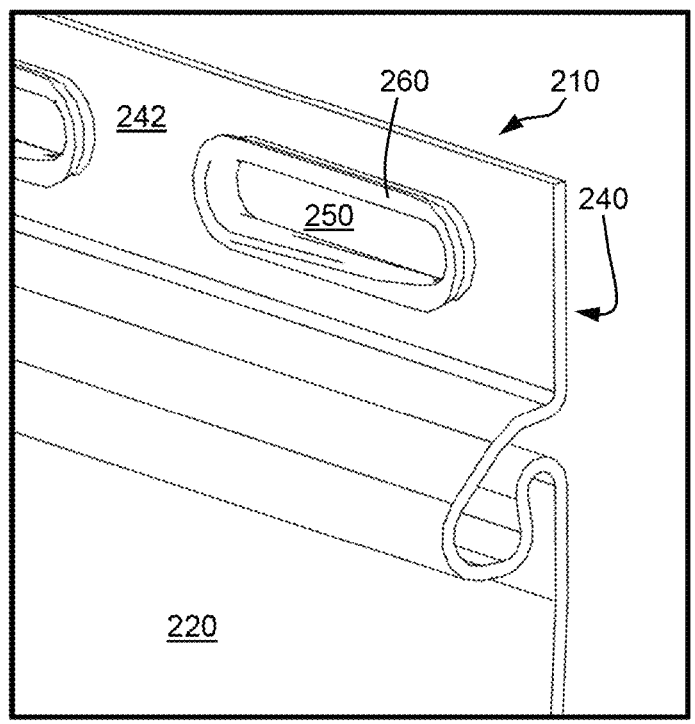
FIG. 2A is a schematic perspective view of a portion of a building surface panel according to another embodiment of the disclosure.
Figure 2B:
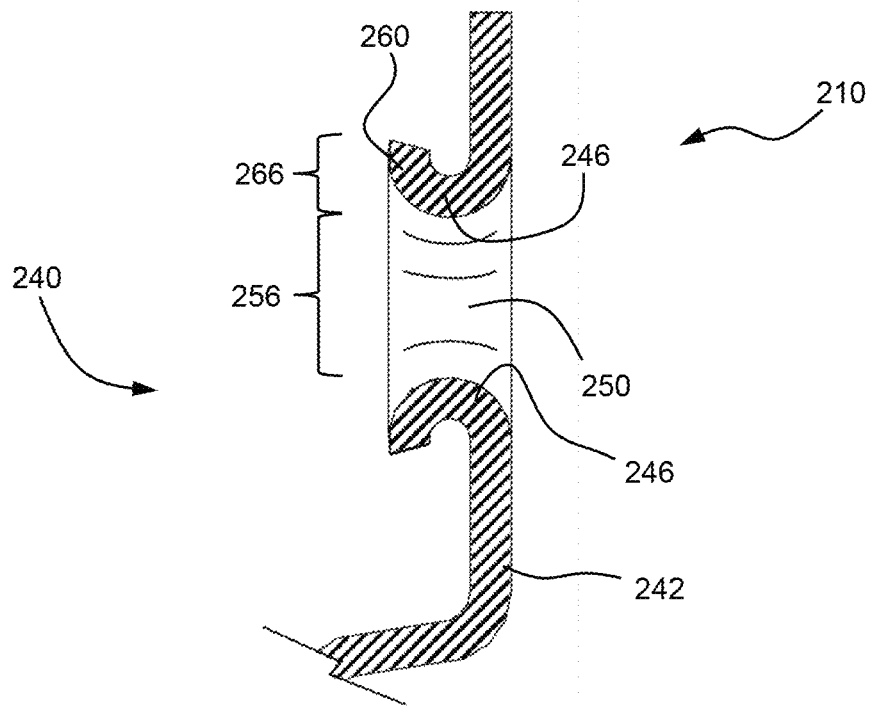
FIG. 2B is a schematic cross-sectional view of a portion of the building surface panel of FIG. 2A.

In certain embodiments of the building surface panel as otherwise described herein, the first reinforcing projection is a flap that is connected to the longitudinal strip along an upper portion of the perimeter edge of the first aperture. For example, as shown in FIGS. 1B and 1C, first reinforcing projection 160 of building surface panel 110 is configured as a flap that is positioned on one side of first aperture 150 and is connected to the longitudinal strip along an upper portion of perimeter edge 152 of first aperture 150. In other embodiments, the first reinforcing projection is connected to the longitudinal strip along a bottom portion of the perimeter edge of the first aperture. Such an embodiment may also have the configuration of a flap. Further, in other embodiments, the first projection includes an upper section that is connected along an upper portion of the perimeter edge and a lower portion that is connected along a lower portion of the perimeter edge. Still, in other embodiments, the first projection is formed as a loop that extends around the entire perimeter edge of the first aperture. Such an embodiment is shown in FIGS. 2A and 2B and described further below.

In certain embodiments of the building surface panel as otherwise described herein, a width of the first reinforcing projection is substantially equal to a width of the first aperture. Further, in certain embodiments of the building surface panel as otherwise described herein, a length of the first reinforcing projection is substantially equal to a length of the first aperture. For example, in building surface panel 110, shown in FIGS. 1A-1C, the length 154 of first aperture 150 is substantially the same as the length 164 of first reinforcement projection 160 (FIG. 1B). Likewise, the width 156 of first aperture 150 is substantially the same as the width 166 of first reinforcement projection 160 (FIG. 1C). The phrase "substantially the same" as used herein, means differing by no more than 10%. Further, in some embodiments, the described lengths and widths differ by no more than 5% or by no more than 2%.

In certain embodiments of the building surface panel as otherwise described herein, the first reinforcing projection surrounds the first aperture. For example, such an embodiment is shown in FIGS. 2A and 2B, which illustrate a portion of a building surface panel 210. Similar to building surface panel 110, shown in FIGS. 1A-1C, building surface panel 210 includes a panel body 220 and a fastening element 240 extending along an edge of the panel body 220. The fastening element 240 includes a longitudinal strip 242 with a first aperture 250 extending therethrough. A first reinforcing projection 260 extends outward from the perimeter edge of first aperture 250 around the circumference of the aperture. Accordingly, first reinforcing projection 260 surrounds the first aperture 250 of fastening element 240.

In certain embodiments of the building surface panel as otherwise described herein, a width of the first reinforcing projection is substantially equal to half the width of the first aperture. For example, as shown in FIG. 2B, the width 266 of first reinforcing projection 260 is about equal to half the width 256 of first aperture 250. Thus, the sum of the portion of first reinforcing projection 260 on the top of first aperture 250 and the portion of first reinforcing projection 260 on the bottom of first aperture 250 is substantially equal to the entire width of first aperture 250.

In certain embodiments of the building surface panel as otherwise described herein, the first reinforcing projection is formed from material that is removed from the longitudinal strip to form the first aperture. For example, the material that forms first reinforcing projection 160 in building surface panel 110 is formed from material that is partially detached from longitudinal strip 142 and then folded away from the surface of the longitudinal strip 142 so as to form the first aperture 150 and the first reinforcing projection 160, as explained in more detail below. Likewise, the material that forms first reinforcing projection 260 in building surface panel 210 is formed from material that is partially detached from longitudinal strip 242 and then folded in opposing direction so as to form the first reinforcing projection 260 on both sides of first aperture 250.

In certain embodiments of the building surface panel as otherwise described herein, the first reinforcing projection is connected to the longitudinal strip along a fold. For example, as illustrated in the cross-sectional view shown in FIG. 1C, the first reinforcing projection 160 of fastening element 140 is coupled to the longitudinal strip 142 by a fold 146 where the material that forms first reinforcing projection 160 is bent away from the surface formed by longitudinal strip 142. Likewise, as illustrated in the cross-sectional view shown in FIG. 2B, the first reinforcing projection 260 of fastening element 240 is connected at both the bottom and top sides of first aperture 250 by a fold 246 where the material of the reinforcing projection 260 is bent away from the surface formed by longitudinal strip 242.

In certain embodiments of the building surface panel as otherwise described herein, the fold positions the first reinforcing projection substantially parallel to the longitudinal strip. For example, as shown in the cross-sectional view of FIG. 1C, first reinforcement projection 160 of fastening element 140 of building surface panel 110 is connected to longitudinal strip 142 by a sharp fold that places first reinforcing projection 160 substantially against longitudinal strip 142 and substantially parallel to longitudinal strip 142.

In other embodiments, the fold positions the first reinforcing projection at an angle to the longitudinal strip. The angle referred to herein is formed by the direction of extension of the reinforcing projection along its width with respect to the surface of the longitudinal strip as measured about the fold. For example, were the first reinforcement projection 160 of fastening element 140 extending slightly outward from the longitudinal strip rather than against the longitudinal strip, it would form a small acute angle.

Having the first reinforcement projection disposed at an angle to the longitudinal strip can help prevent builders from pinning the building surface panel to a support structure. As is known to those of ordinary skill in the art, if a fastener is inserted too far into a support structure when securing a building surface panel, a portion of the fastener can tighten against the building surface panel and prevent lateral movement of the panel. With the first reinforcement projection extending outward at an angle to the longitudinal strip, the builder will need to deform the first reinforcement projection before the panel is pinned to the support structure. Such deformation of the first reinforcement projection can serve as a warning to the builder that he or she has inserted the fastener too far. In some embodiments, the angled reinforcement projection may provide a spring force against the fastener, so as to provide tension on the fastener but not inhibit lateral movement of the panel upon thermal expansion.

Figure 3A:
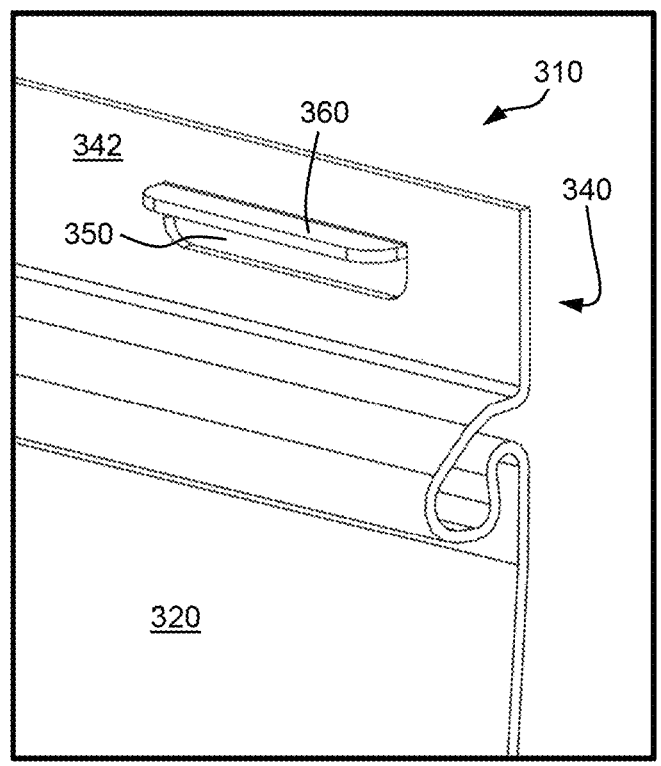
FIG. 3A is a schematic perspective view of a portion of a building surface panel according to yet another embodiment of the disclosure.
Figure 3B:
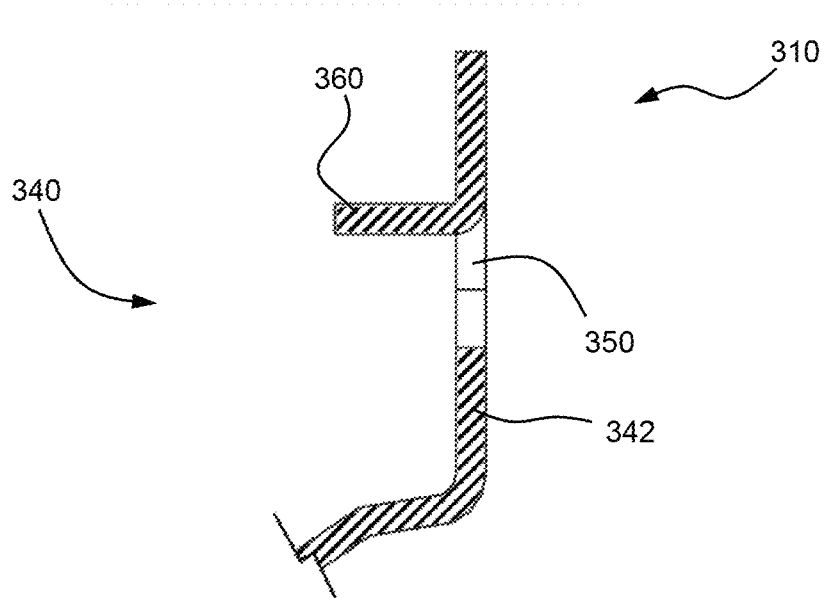
FIG. 3B is a schematic cross-sectional view of a portion of the building surface panel of FIG. 3A.

An embodiment including a first reinforcement projection disposed at an angle to the longitudinal strip is shown in FIGS. 3A and 3B. Similar to building surface panels 110 and 210, building surface panel 310 includes a panel body 320 and a fastening element 340 extending along an edge of the panel body 320. The fastening element 340 includes a longitudinal strip 342 with a first aperture 350 extending therethrough. A first reinforcing projection 360 extends outward from the perimeter edge of first aperture 350 along the top of first aperture 350. Moreover, the first reinforcing projection 360 is positioned at an angle of nearly 90 degrees to longitudinal strip 342.

In certain embodiments of the building surface panel as otherwise described herein, the angle between the first reinforcing projection and the longitudinal strip is no more than 90 degrees. By having an angle between the first reinforcing projection and the longitudinal strip be no more than 90 degrees, the first reinforcing projection is prevented from blocking the first aperture. In some embodiments, the first reinforcing projection and longitudinal strip are disposed at an angle that is smaller than 90 degrees, such as no more than 80 degrees, no more than 70 degrees, no more than 60 degrees, no more than 45 degrees or no more than 30 degrees.

In certain embodiments of the building surface panel as otherwise described herein, the first reinforcing projection is disposed on a front side of the longitudinal strip. For example, in each of building surface panels 110, 210 and 310, the respective first reinforcing projection is disposed on the front side of the longitudinal strip and, likewise, the front side of the panel. By placing the reinforcing projection on the front side of the panel, the rear face of the fastening element can be planar allowing it to laying against the support structure upon installation. But in some embodiments, the rear surface of the fastening element is not planar. Further, in other embodiments, the first reinforcing projection is disposed on the rear side of the longitudinal strip.

Figure 4:
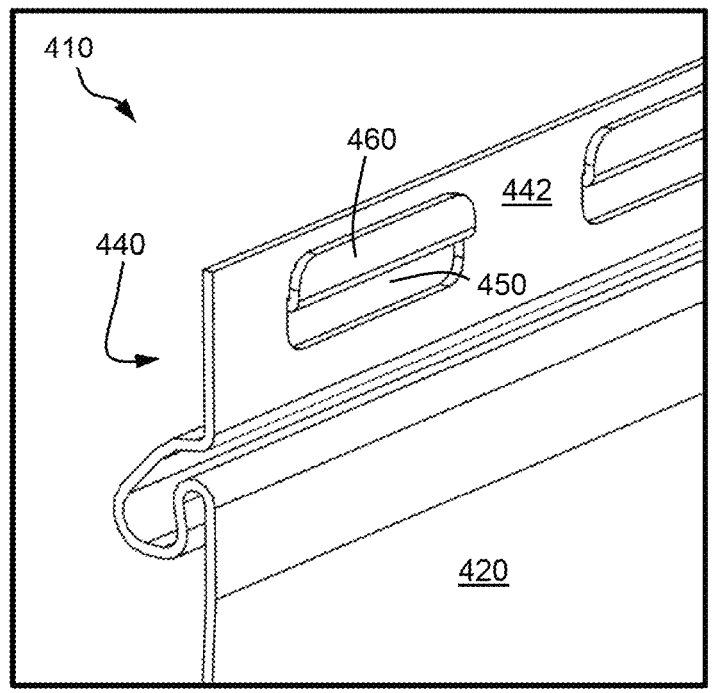
FIG. 4 is a schematic perspective rear view of a portion of a building surface panel according to another embodiment of the disclosure.
Figure 5:
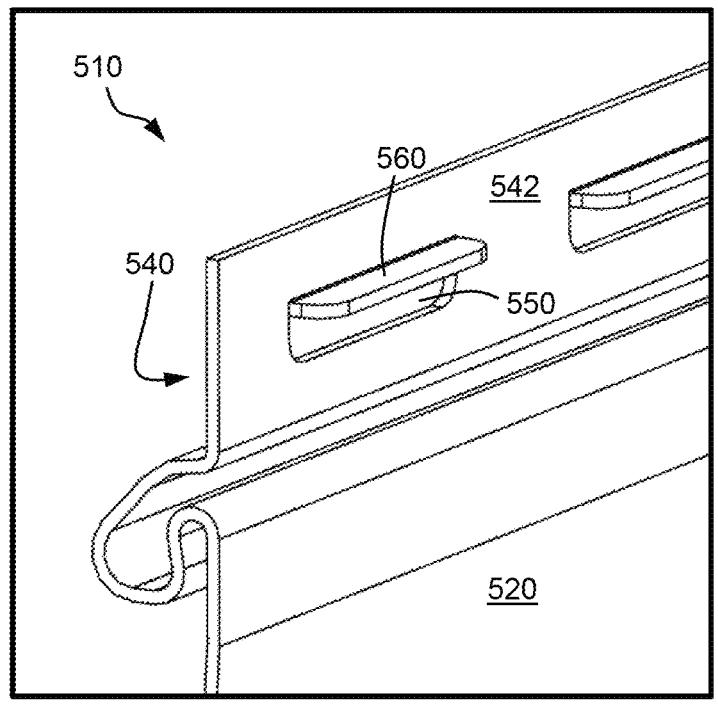
FIG. 5 is a schematic perspective rear view of a portion of a building surface panel according to still another embodiment of the disclosure.

For example, FIGS. 4 and 5 illustrate embodiments where the first reinforcing projection is disposed on the rear side of the longitudinal strip. Building surface panel 410, shown in FIG. 4, includes a panel body 420 and a fastening element 440 extending along an edge of the panel body 420. The fastening element 440 includes a longitudinal strip 442 with a first aperture 450 extending therethrough. A first reinforcing projection 460 extends outward from the perimeter edge of first aperture 450 and is positioned on the rear side of longitudinal strip 442 and parallel with the longitudinal strip. Similarly, building surface panel 510, shown in FIG. 5, includes a panel body 520 and a fastening element 540 extending along an edge of the panel body 520. The fastening element 540 includes a longitudinal strip 542 with a first aperture 550 extending therethrough. A first reinforcing projection 560 extends outward from the perimeter edge of first aperture 550 and is positioned on the rear side of longitudinal strip 542 at an angle the longitudinal strip 542.

In certain embodiments of the building surface panel as otherwise described herein, the fastening element has a roll over hem including a fold along a top edge of the longitudinal strip that forms a flange extending along the length of the fastening element. Such a roll over hem may increase the stiffness and strength of the fastening element, as is understood by those of ordinary skill in the art.

In certain embodiments of the building surface panel as otherwise described herein, the first reinforcing projection and flange overlap. Such an embodiment is shown in cross-section in FIG. 6. Building surface panel 610 includes a panel body and a fastening element 640 extending along an edge of the panel body 620. The fastening element 640 includes a longitudinal strip 642 with a first aperture 650 extending therethrough. A roll over hem is included at the top of longitudinal strip 642 and forms a flange 648 extending down from the top of the fastening element 640 to the vicinity of first aperture 650. A first reinforcing projection 660 extends outward from the perimeter edge of first aperture 650 and folds over flange 648 so as to form an overlap between first reinforcing projection 660 and flange 648. The added layer of material provided by the flange 648 of the roll over hem adds additional strength to the support provided by first reinforcing projection 660. While first reinforcing projection 660 is folded over flange 648 in building surface panel 610, in other embodiments the overlap is formed by the flange of the roll over hem laying over the first reinforcing projection.

In certain embodiments of the building surface panel as otherwise described herein, the first aperture is one of a group of apertures, each aperture in the group of apertures having a reinforcing projection extending outward from a perimeter edge of the respective aperture. For example, as shown in FIG. 1, first aperture 150 is one of a group of apertures positioned along the fastening element, each of which has a respective reinforcing projection extending from a perimeter edge of the aperture. In some embodiments, the apertures in the fastening element are formed in a line. For example, the apertures in fastening element 140 of building surface panel 110 are formed in a line that extends in the same direction as the length of the building surface panel and the direction of the extension of the slot shape of the apertures.

In some embodiments, the group of apertures that are associated with reinforcing projections form all of the apertures in the fastening element. In other embodiments, the fastening element includes another group of apertures that does not have any associated reinforcing projections. In other words, in some embodiments the fastening element includes some apertures with reinforcing projections and other apertures without reinforcing projections.

In certain embodiments of the building surface panel as otherwise described herein, the building surface panel is a siding panel. For example, building surface panel 110 of FIGS. 1A-1C is a siding panel that is configured to interlock with other siding panels, as set forth below, and cover the exterior surface of a house or other building. In other embodiments the building surface panel is a siding accessory, such as a siding trim panel. In other embodiments, the building surface panel is another building product, such as soffit or a roofing panel. Other types of panels are also possible.

In certain embodiments of the building surface panel as otherwise described herein, the siding panel also includes a first lock extending along the first edge of the panel body and a second lock extending along the second edge of the panel body. For example, as shown in FIG. 1, building surface panel 110 includes a first lock 116 extending along the first edge 134 of panel body 120 and a second lock 118 extending along second edge 136 of panel body 120. First lock 116 is configured to be received in a corresponding second lock of a neighboring siding panel having a similar construction. Likewise, second lock 118 is configured to receive a corresponding first lock of another neighboring siding panel that has a similar construction.

In certain embodiments of the building surface panel as otherwise described herein, the panel body has a contoured profile that replicates one or more planks of wood. For example, the panel body 120 of building surface panel 110, as shown in FIG. 1, has a contoured profile configured to replicate an upper plank of wood that overlaps a lower plank of wood. Likewise, the contour is configured such that the lower plank of wood may appear to overlap a portion of a panel that may be positioned below building surface panel 110.

In certain embodiments of the building surface panel as otherwise described herein, the panel body has a uniform cross-sectional shape along its length. For example, in some embodiments, the building surface panel is extruded along its length and the general shape of the panel, and specifically the panel body, is made uniform along its length. The cross-sectional shape, as referred to herein, relates to the overall shape of the cross section, and does not encompass small variations in surface texture, which may be embossed on a surface of the panel body. In other embodiments, the cross-sectional shape varies along its length. For example, in some embodiments, the material of the building surface panel is molded so as to have projections and depressions along its length. For example, in some embodiments, the building surface pane is a siding panel that has the visual appearance of shake siding.

In certain embodiments of the building surface panel as otherwise described herein, the building surface panel has a length of at least 4 feet, e.g., at least 6 feet, e.g., at least 8 feet. Further, in some embodiments, the building surface panel has a length of no more than 50 feet, e.g., no more than 40 feet, e.g., no more than 30 feet. For example, in some embodiments, the building surface panel has a length in a range from 4 feet to 50 feet, e.g., from 6 feet to 40 feet, e.g., from 8 feet to 30 feet.

In certain embodiments of the building surface panel as otherwise described herein, the building surface panel has a width of at least 4 inches, e.g., at least 6 inches. Further, in some embodiments, the building surface panel has a width of no more than 24 inches, e.g., no more than 18 inches. For example, in some embodiments, the building surface panel has a width in a range from 4 inches to 24 inches, e.g., from 6 inches to 18 inches. In other embodiments, the building surface panel has other length and width dimensions. For example in some embodiments, the building surface panel is a trim panel, or is representative of only one or two shingles. In such embodiments, the lengths and widths may be smaller than those described above.

In certain embodiments of the siding panel as otherwise described herein, the longitudinal strip of the fastening element has a material thickness in a range from 0.03 inches to 0.20 inches. For example, in some embodiments, the fastening element is cut and folded from a thin sheet of material. In some embodiments, the entire building surface panel is formed from such a thin sheet of material.

Embodiments of the siding panel may be formed from various different materials, and may be constructed in a single piece or in layers of material. In certain embodiments of the siding panel as otherwise described herein, the panel body is formed of one or more of polypropylene, polyethylene, polyvinyl chloride (PVC), acrylonitrile styrene acrylate (ASA), acrylonitrile ethylene styrene (AES), polyurethane, or acrylonitrile butadiene styrene (ABS).

Figure 7:
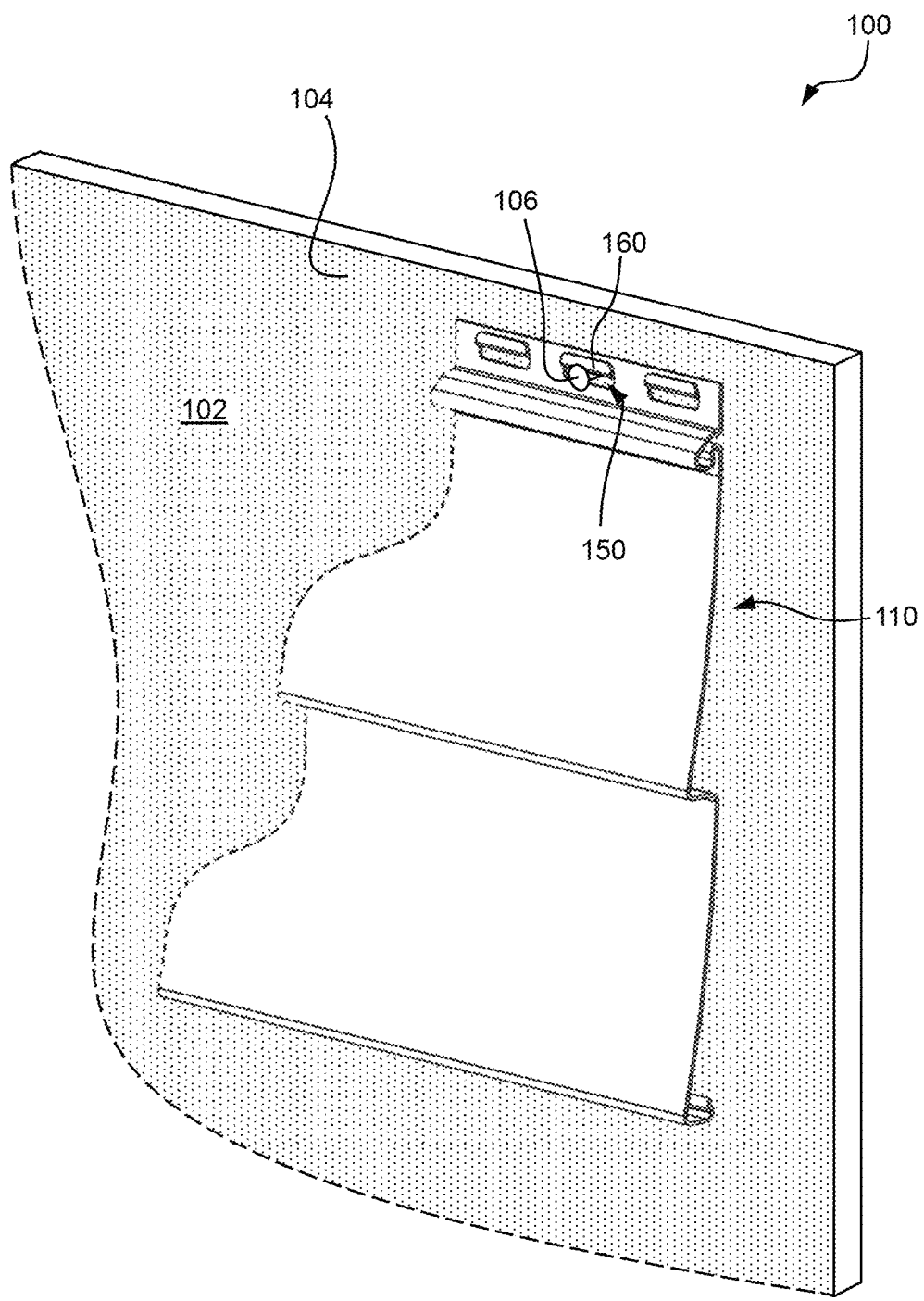
FIG. 7 is a schematic perspective view of a building surface cladding system according to an embodiment of the disclosure and including the building surface panel of FIG. 1A.

In another aspect, the disclosure provides a building surface cladding system including a support structure having a front face and a building surface panel according to the disclosure disposed against the front face of the support structure. A fastener extends through the first aperture of the building surface panel and into the support structure so as to hold the building surface panel against the support structure. Such a building surface cladding system is shown in FIG. 7. Building surface cladding system 100 includes a support structure 102 that provides a framework for the cladding system. First building surface panel 110 is secured to a front face 104 of support structure 102 using a fastener 106. In particular, fastener 106 is in the form of a nail and extends through first aperture 150 of fastening element 140 in order to secure building surface panel 110 against the front face 104 of support structure 102.

In certain embodiments of the building surface cladding system as otherwise described herein, the building surface cladding system forms an exterior wall surface. For example, in some embodiments the support structure is an exterior sheathing. As will be understood by those of ordinary skill in the art, such an exterior sheathing can include a rain protection layer, house wrap, and/or may include furring strips. In other embodiments, the support structure is another flat structural component of a construction wall.

In certain embodiments of the building surface cladding system as otherwise described herein, a portion of the fastening element of the building surface panel rests on the fastener. For example, building surface panel 110, as shown in the system depicted in FIG. 7, hangs on the fastener 106, such that the weight of building surface panel 110 is supported by fastener 106.

In certain embodiments of the building surface cladding system as otherwise described herein, the portion of the fastening element that rests on the fastener includes a fold where the first reinforcing projection is connected to the longitudinal strip. For example, the portion of fastening element 140 that is supported by fastener 106 in system 100 is the folded area 146 where first reinforcing projection 160 is connected to longitudinal strip 142 (as shown in FIG. 1C). Thus, the portion of fastening element 140 that is supported by fastener 106 has a greater material thickness than other portions of building surface panel 110.

In some embodiments, the building surface cladding system includes a plurality of building surface panels that are secured to one another. For example, as shown in FIGS. 1A to 1C, in some embodiments the building surface panel includes a first lock along the first edge of the panel body and a second lock along the second edge of the panel body. Moreover, in some embodiments, the building surface panel is connected to a second building surface panel, where the second building surface panel also includes a panel body having a length extending from a first end to a second end and a width extending from a first edge to a second edge. A first lock extends along the first edge of the panel body and a second lock extends along the second edge of the panel body. Such a system may be configured so that the second lock of the building surface panel engages the first lock of the second building surface panel. In some embodiments, each of the building surface panels in the cladding system includes one or more apertures with reinforcing projections. In other embodiments, the cladding system includes some panels that have apertures with reinforcing projections and other panels that do not have any reinforcing projections.

In another aspect, the disclosure provides a method of making a building surface panel according to the disclosure. The method includes extruding a material sheet through a die and shaping the material sheet so as to form the panel body and a longitudinal strip of a fastening element. The method also includes cutting an opening through the material sheet and pushing a section of the material sheet that is adjacent to the opening outward from the rest of the material sheet so as to form the first aperture in the material sheet and the first reinforcing projection formed by the section of the material sheet.

In certain embodiments of the method as otherwise described herein, cutting the opening through the material sheet and pushing the section of the material sheet outward from the rest of the material sheet is carried out in a single operation. For example, in some embodiments, a punching operation is used to both shear an opening in the material sheet and to push the section of material outward from the rest of the material sheet. For example, in some embodiments, the punching operation uses a punch and die to form an extruded hole that moves the section of material outward from the rest of the material sheet. In other embodiments, cutting the opening occurs in one step, while pushing the section of material outward occurs in another step. Further, in some embodiments, positioning the reinforcing projection in its final location occurs in a single step, while in other embodiments it occurs in multiple steps. For example, in some embodiments, the opening in the material sheet and the pushing of a section of the material sheet occurs in a first step, while a second step is used to fold the section of the material sheet to lie flat against the rest of the material sheet, thereby forming a reinforcing projection and longitudinal strip such as shown in FIG. 1A.

In certain embodiments of the method as otherwise described herein, shaping the material sheet occurs before cutting the opening in the material sheet. For example, in some embodiments, after the material sheet is extruded, the material sheet is bent in certain locations to form the general cross-sectional shape of the building surface panel. Further steps are subsequently taken to form one or more apertures and reinforcing projections. In other embodiments, any apertures and reinforcing projections are formed first, and then the material sheet is bent and shaped.

In certain embodiments of the method as otherwise described herein, shaping the material sheet includes bending the material sheet so as to form a first lock along the first edge of the panel body and a second lock along the second edge of the panel body. For example, in some embodiments, the material sheet is folded and bent to form a siding panel, and each of a panel body, an upper, a lower lock, and a fastening element is formed from the material sheet, as shown in FIG. 1A.

Figure 6:
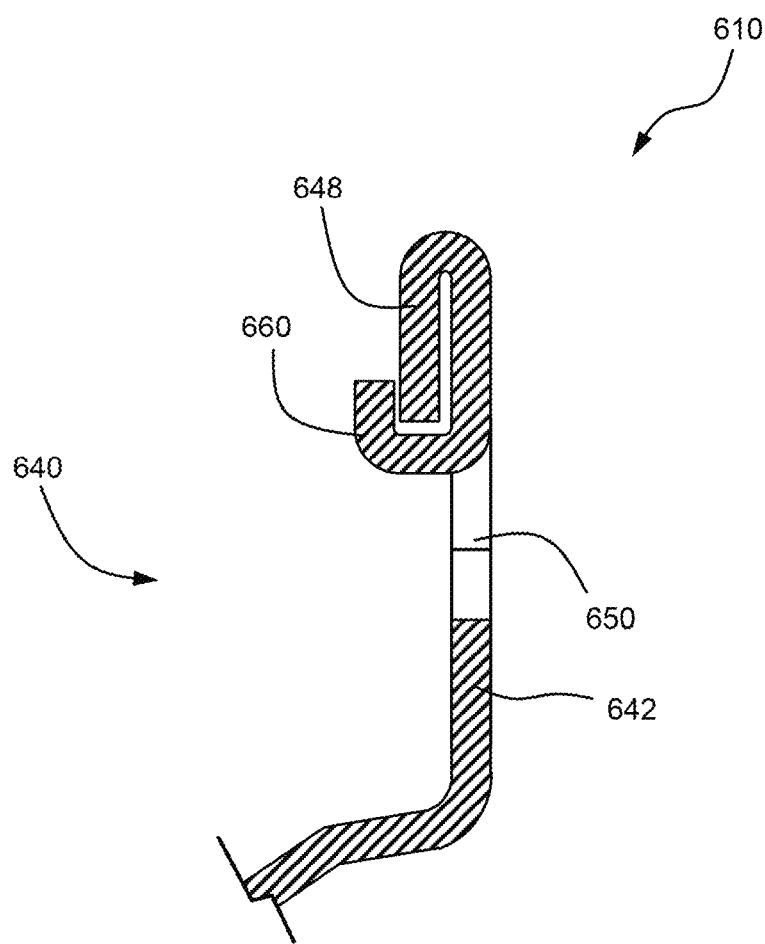
FIG. 6 is a schematic cross-sectional view of a portion of a building surface panel according to another embodiment of the disclosure.

In certain embodiments of the method as otherwise described herein, shaping the material sheet includes forming a roll over hem along an edge of the material sheet. Further, in certain embodiments of the method as otherwise described herein, the method includes positioning the first reinforcement projection so as to overlap the roll over hem. For example, in some embodiments, an edge of the material sheet is folded over to form a roll over hem within the fastening element, and the reinforcing projection is subsequently formed and folded over a flange of the roll over hem, as shown in FIG. 6. In other embodiments, the reinforcing projection is formed first, and the flange of the roll over hem is folded over the reinforcing projection.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A building surface panel comprising:
   a longitudinal panel body extending along a length from a first end to a second end and having a first edge and a second edge; and
   a fastening element including:
      a longitudinal strip extending along the first edge of the panel body,
      a first aperture passing through the longitudinal strip, the first aperture being an elongated slot extending along a length of the longitudinal strip, and
      a first reinforcing projection extending outward from a perimeter edge of the first aperture, wherein the first reinforcing projection is a flap connected to the longitudinal strip along a fold at an upper portion of a perimeter edge of the first aperture, the fold positioning the first reinforcing projection substantially parallel to the longitudinal strip, wherein the first reinforcing projection is a single, continuous reinforcing projection defined along at least an upper portion of the perimeter edge of the first aperture, wherein the first aperture and first reinforcing projection are formed by cutting an opening through a material of the longitudinal strip and pushing a section of the material that is adjacent to the opening outward from the rest of the material so as to form the first aperture and the first reinforcing projection formed by the section of the material.

2. The building surface panel according to claim 1, wherein the first reinforcing projection extends around an entirety of the perimeter edge of the first aperture.

3. The building surface panel according to claim 1, wherein a width of the first reinforcing projection is substantially equal to a width of the first aperture.

4. The building surface panel according to claim 1, wherein a length of the first reinforcing projection is substantially equal to a length of the first aperture.

5. The building surface panel according to claim 1, wherein the first reinforcing projection is formed from material that is removed from the longitudinal strip to form the first aperture.

6. The building surface panel according to claim 1, wherein the first reinforcing projection is disposed on a front side of the longitudinal strip.

7. The building surface panel according to claim 1, wherein the first aperture is one of a group of apertures, each aperture in the group of apertures having a reinforcing projection extending outward from a perimeter edge of the respective aperture.

8. The building surface panel according to claim 1, wherein the building surface panel has a length of at least 4 feet and no more than 50 feet, and a width of at least 4 inches and no more than 24 inches.

9. The building surface panel according to claim 1, wherein the longitudinal strip of the fastening element has a material thickness in a range from 0.03 inches to 0.20 inches.

10. The building surface panel according to claim 1, wherein the building surface panel is formed of one or more of polypropylene, polyethylene, polyvinyl chloride (PVC), acrylonitrile styrene acrylate (ASA), acrylonitrile ethylene styrene (AES), polyurethane, or acrylonitrile butadiene styrene (ABS).

11. The building surface panel according to claim 1, wherein the fastening element has a roll over hem including a fold along a top edge of the longitudinal strip that forms a flange extending along the length of the fastening element, and wherein the first reinforcing projection overlaps the flange.

12. The building surface panel according to claim 11, wherein the first reinforcing projection and flange overlap.

13. The building surface panel according to claim 1, wherein the building surface panel is a siding panel.

14. The building surface panel according to claim 13, further comprising a first lock extending along the first edge of the panel body and a second lock extending along the second edge of the panel body.

15. A building surface cladding system comprising:
a support structure having a front face;
the building surface panel according to claim 1 disposed against the front face of the support structure; and
a fastener extending through the first aperture of the building surface panel and into the support structure so as to hold the building surface panel against the support structure, wherein the fold rests on the fastener.

16. The building surface cladding system according to claim 15, wherein the building surface panel includes a first lock along the first edge of the panel body and a second lock along the second edge of the panel body,
wherein the building surface cladding system comprises a second building surface panel comprising:
a panel body having a length extending from a first end to a second end, and a width extending from a first edge to a second edge,
a first lock extending along the first edge of the panel body, and
a second lock extending along the second edge of the panel body; and
wherein the second lock of the building surface panel engages the first lock of the second building surface panel.

17. The building surface cladding system according to claim 15, wherein the first reinforcing projection is partially disposed between a head of the fastener and the support structure.

* * * * *